US010015456B2

(12) United States Patent
Toyooka et al.

(10) Patent No.: US 10,015,456 B2
(45) Date of Patent: Jul. 3, 2018

(54) PROJECTOR AND CONTROL METHOD

(71) Applicant: SEIKO EPSON CORPORATION, Tokyo (JP)

(72) Inventors: Takashi Toyooka, Matsumoto (JP); Tatsuya Iguchi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/408,176

(22) Filed: Jan. 17, 2017

(65) Prior Publication Data

US 2017/0208303 A1 Jul. 20, 2017

(30) Foreign Application Priority Data

Jan. 20, 2016 (JP) ................................. 2016-008773

(51) Int. Cl.
H04N 9/31 (2006.01)
G02B 5/30 (2006.01)
G02B 27/28 (2006.01)
G03B 21/20 (2006.01)

(52) U.S. Cl.
CPC ......... H04N 9/3158 (2013.01); G02B 5/3083 (2013.01); G02B 27/283 (2013.01); G03B 21/204 (2013.01); G03B 21/2053 (2013.01); G03B 21/2073 (2013.01); H04N 9/3155 (2013.01); H04N 9/3167 (2013.01); H04N 9/3194 (2013.01)

(58) Field of Classification Search
CPC .. H04N 9/3158; H04N 9/3155; H04N 9/3167; H04N 9/3194; G02B 5/3083; G02B 27/283; G03B 21/204

USPC ................................. 348/762, 744; 362/260
See application file for complete search history.

(56) References Cited

U.S. PATENT DOCUMENTS

| 8,733,940 B2 * | 5/2014 | Tanaka ................... G03B 21/28 353/20 |
| 9,429,831 B2 * | 8/2016 | Akiyama ........... G03B 21/2073 |
| 9,500,937 B2 * | 11/2016 | Tanaka ................. G03B 21/204 |
| 9,500,941 B2 * | 11/2016 | Akiyama ............. G03B 21/208 |
| 2010/0328611 A1 | 12/2010 | Silverstein et al. |
| 2015/0009477 A1 | 1/2015 | Toyooka et al. |
| 2015/0153020 A1 | 6/2015 | Akiyama |
| 2017/0208303 A1 | 7/2017 | Toyooka et al. |

FOREIGN PATENT DOCUMENTS

JP 2015-106130 A 6/2015

* cited by examiner

Primary Examiner — Trang U Tran
(74) Attorney, Agent, or Firm — Oliff PLC

(57) ABSTRACT

A projector includes a light-emitting element that outputs light of a first wavelength band which is in a first polarization state; a retardation plate that converts a portion of the light into a second polarization state; a polarization separation element that separates the light into a first flux of light in the first polarization state and a second flux of light in a second polarization state; a phosphor, which outputs a third flux of light of a second wavelength band; an optical modulator that modulates the light in accordance with a video signal; a light-emitting element control unit that controls brightness of the light-emitting element in accordance with brightness information; and a retardation plate control unit that controls a rotation angle of the retardation plate in accordance with the brightness information.

8 Claims, 10 Drawing Sheets

PROJECTOR AND CONTROL METHOD

CROSS-REFERENCE

The entire disclosure of Japanese Patent Application No. 2016-008773, filed Jan. 20, 2016 is expressly incorporated by reference herein.

BACKGROUND

1. Technical Field

The present invention relates to a technique for controlling the rotation angle of a retardation plate in a projector.

2. Related Art

Light source devices using a solid-state light source such as a laser diode have been known. In such light source devices, light of a certain wavelength band which is output from the solid-state light source is separated by a polarization separation mirror. One beam of light separated is guided to a phosphor, as excitation light, and the phosphor emits light of a wavelength band different from that of the solid-state light source. The light which is output from the phosphor is synthesized with the other beam of light separated, and is output as light including more wavelength band components.

Such light source devices have a problem in that a white balance of light to be output shifts due to a change in the characteristics of the solid-state light source or the phosphor over time. On the other hand, for example, JP-A-2015-106130 discloses a light source device that compensates for a change in color balance associated with a change over time during its use.

In the technique disclosed in JP-A-2015-106130, a change in color due to a deterioration in a light source is measured when the brightness of a light source is set to a specific value, and a color balance is adjusted by rotating a retardation plate in accordance therewith. However, in a case where there are a plurality of brightness settings of the light source without being limited to a single specific value, making the rotation angle of the retardation plate common at the plurality of brightness settings causes a problem in that the color balance varies for each brightness setting.

SUMMARY

An advantage of some aspects of the invention is to provide a technique for adjusting a color balance more simply with respect to a plurality of brightness settings.

An aspect of the invention provides a projector including: a light-emitting element that outputs light of a first wavelength band which is in a first polarization state; a retardation plate that converts a portion of the light output from the light-emitting element into a second polarization state in accordance with a rotation angle of the retardation plate; a polarization separation element that separates the light from the retardation plate into a first flux of light in the first polarization state and a second flux of light in a second polarization state; a phosphor, excited by the first flux of light, which outputs a third flux of light of a second wavelength band different from the first wavelength band; an optical modulator that modulates the light in accordance with a video signal; a light-emitting element control unit that controls brightness of the light-emitting element in accordance with brightness information; and a retardation plate control unit that controls a rotation angle of the retardation plate in accordance with the brightness information.

According to such a projector, it is possible to adjust a color balance in accordance with the brightness information.

The brightness information may include brightness information which is set in accordance with a user's instruction input.

According to such a projector, it is possible to adjust a color balance in accordance with the brightness information which is set in accordance with a user's instruction input.

The projector may further include a setting unit that sets the brightness information in accordance with an analysis result of the video signal.

According to such a projector, it is possible to adjust a color balance in accordance with the brightness information which is set in accordance with the analysis result of the video signal.

The projector may further include a setting unit that sets the brightness information in accordance with a temperature of the light-emitting element.

According to such a projector, it is possible to adjust a color balance in accordance with the brightness information which is set in accordance with the temperature of the light-emitting element.

The projector may further include: a sensor that detects illuminance of the light which is output from the light-emitting element; and a setting unit that sets the brightness information in accordance with an output of the sensor.

According to such a projector, it is possible to adjust a color balance in accordance with the brightness information which is set in accordance with the illuminance of the light which is output from the light-emitting element.

The projector may further include an integration unit that integrates a plurality of pieces of brightness information, and the retardation plate control unit may control the rotation angle of the retardation plate in accordance with brightness information integrated by the integration unit.

According to such a projector, it is possible to adjust a color balance in consideration of a plurality of pieces of brightness information.

The projector may further include a color correction unit that performs color correction in accordance with the brightness information, and the retardation plate control unit may control the rotation angle of the retardation plate in accordance with a correction result of the color correction unit.

According to such a projector, it is possible to adjust a color balance in accordance with the correction result of the color correction unit.

The projector may further include a generation unit that generates a table for the color correction in accordance with input and output characteristics of the light-emitting element.

According to such a projector, it is possible to adjust a color balance in accordance with a change in the input and output characteristics of the light-emitting element over time.

Another aspect of the invention provides a control method including: causing a light-emitting element to output light of a first wavelength band which is in a first polarization state; causing a retardation plate to convert a portion of the light output from the light-emitting element into a second polarization state in accordance with a rotation angle of the retardation plate; separating the light from the retardation plate into a first flux of light in the first polarization state and a second flux of light in a second polarization state; causing a phosphor excited by the first flux of light to output a third flux of light of a second wavelength band different from the first wavelength band; causing an optical modulator to modulate the light in accordance with a video signal; controlling brightness of the light-emitting element in accordance with brightness information; and controlling the rotation angle of the retardation plate in accordance with the brightness information.

According to such a control method, it is possible to adjust a color balance in accordance with the brightness information.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. First Embodiment 1-1. Configuration

Figure 1:
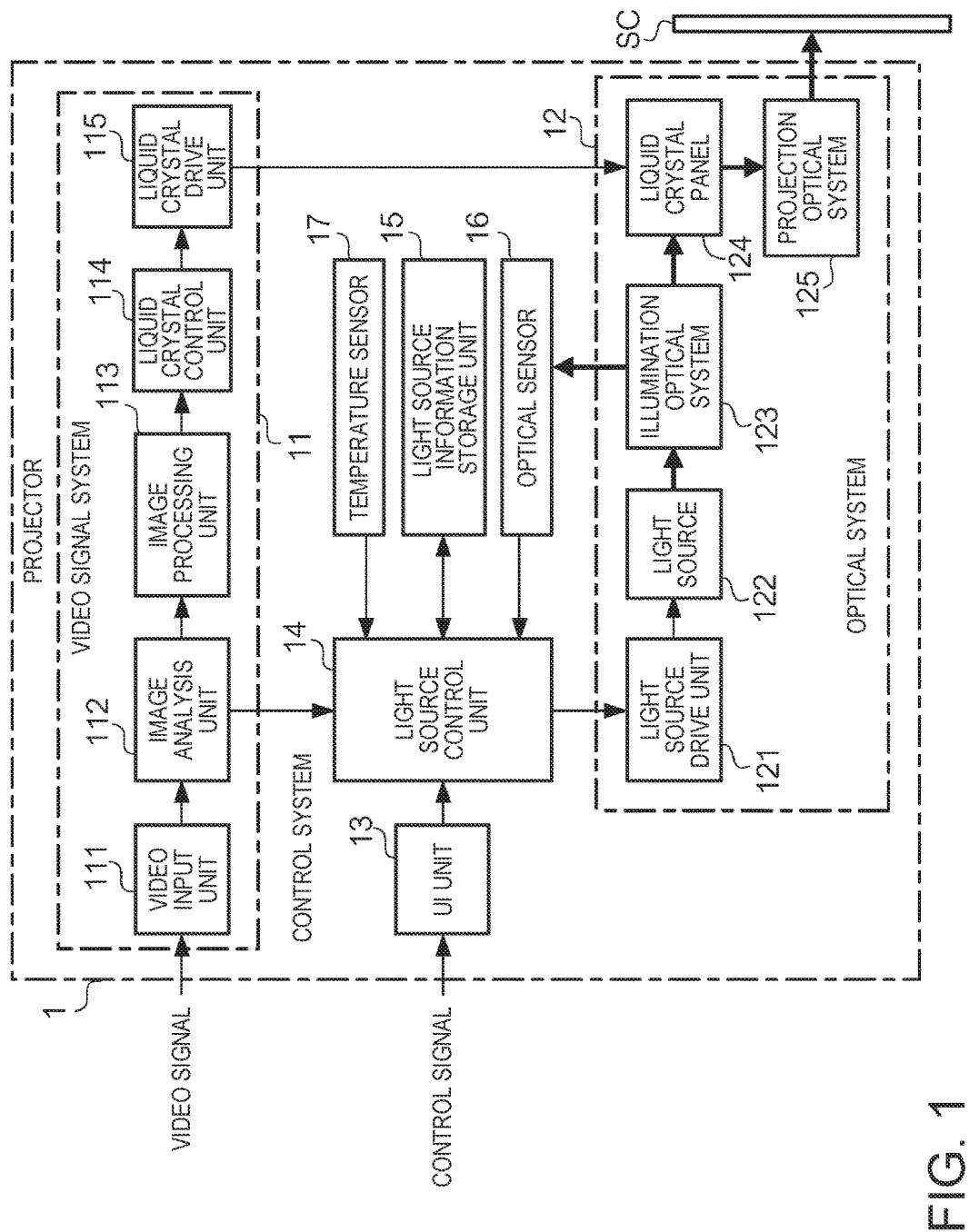
FIG. 1 is a diagram illustrating a functional configuration of a projector according to a first embodiment.

FIG. 1 is a diagram illustrating a functional configuration of a projector 1 according to a first embodiment. The projector 1 is a projector that automatically adjusts a color balance in each of a plurality of brightness settings.

The projector 1 includes a video signal system 11, an optical system 12, a UI unit 13, a light source control unit 14, a light source information storage unit 15, an optical sensor 16, and a temperature sensor 17. The video signal system 11 controls an optical modulator (liquid crystal panel 124 in this example) in accordance with a video signal having received an input. The video signal system 11 includes a video input unit 111, an image analysis unit 112, an image processing unit 113, a liquid crystal control unit 114, and a liquid crystal drive unit 115. The video input unit 111 receives an input of a video signal. The image analysis unit 112 performs an image analysis process on the video signal. In this example, the image analysis process is, for example, a process of specifying the type (movie, sports broadcast, presentation image, or the like) of video indicated by the video signal. The image processing unit 113 performs predetermined image processing (for example, size change or keystone correction) on the video signal. The liquid crystal control unit 114 generates a signal for controlling the liquid crystal panel 124 from the video signal. The liquid crystal drive unit 115 outputs a signal for driving the liquid crystal panel 124 in accordance with the signal which is output from the liquid crystal control unit 114.

The optical system 12 controls light which is projected onto a screen SC (hereinafter, referred to as "projection light"). The optical system 12 includes a light source drive unit 121, a light source 122, an illumination optical system 123, a liquid crystal panel 124, and a projection optical system 125. The light source drive unit 121 drives the light source 122. The light source 122 outputs illumination light. The illumination light refers to light which is modulated later and is changed into projection light. The illumination light is white light including a plurality of wavelength band components. The illumination optical system 123 separates the illumination light into a plurality of color components (for example, three colors of red, green, and blue). The respective beams of light separated into color components are incident on individual liquid crystal panels 124. The liquid crystal panel 124 is an example of an optical modulator that modulates the illumination light in accordance with a video signal. The projection optical system 125 synthesizes beams of light modulated for each color component, and projects the synthesized light as the projection light onto the screen SC.

Figure 2:
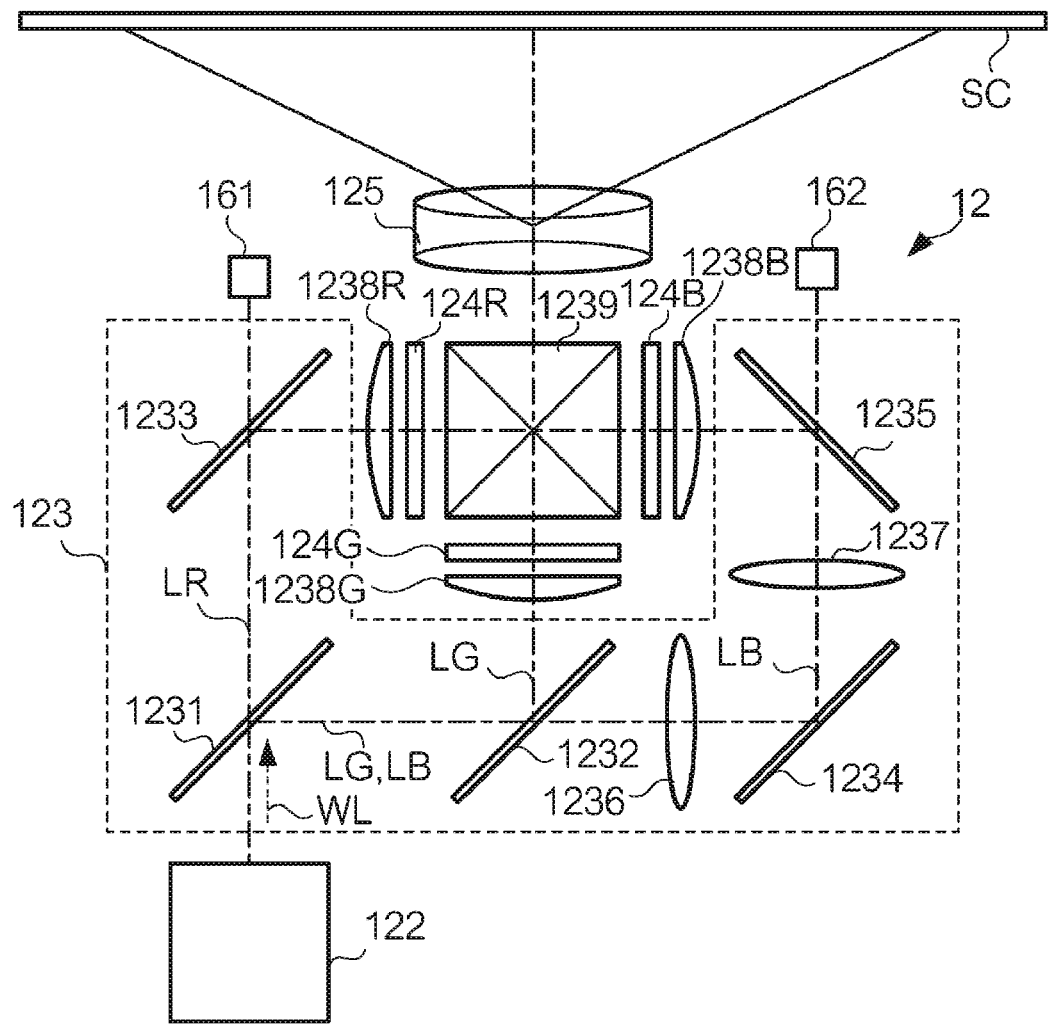
FIG. 2 is a diagram illustrating a configuration of an optical system.

FIG. 2 is a diagram illustrating a specific configuration of the optical system 12. The illumination optical system 123 includes a dichroic mirror 1231, a dichroic mirror 1232, a reflection mirror 1233, a reflection mirror 1234, a reflection mirror 1235, a relay lens 1236, and a relay lens 1237. In this example, in order to individually modulate red light LR, green light LG, and blue light LB, the optical system 12 includes three liquid crystal panels of a liquid crystal panel 124R, a liquid crystal panel 124G, and a liquid crystal panel 124B. In this manner, suffixes R, G, and B are used when constituent elements are distinguished from each other for each color component, and the constituent elements are simply denoted by the liquid crystal panel 124 when they are not distinguished from each other. The same is true of constituent elements other than the liquid crystal panel 124.

The dichroic mirror 1231 separates illumination light WL which is output from the light source 122 into red light LR, and non-red light (green light LG and blue light LB). The dichroic mirror 1231 transmits the red light LR, and reflects the green light LG and the blue light LB. The dichroic mirror 1232 separates the light reflected from the dichroic mirror 1231 into the green light LG and the blue light LB. The dichroic mirror 1232 reflects the green light LG, and transmits the blue light LB.

The reflection mirror 1233 is disposed in the optical path of the red light LR. The reflection mirror 1233 reflects the red light LR having passed through the dichroic mirror 1231, and guides the red light to the liquid crystal panel 124R. The reflection mirror 1234 and the reflection mirror 1235 are disposed in the optical path of the blue light LB. The reflection mirror 1234 and the reflection mirror 1235 reflect the blue light LB having passed through the dichroic mirror 1232, and guide the blue light to the liquid crystal panel 124B. The green light LG is reflected from the dichroic mirror 1232, and is guided to the liquid crystal panel 124G.

The relay lens 1236 and the relay lens 1237 are disposed on the output side of the dichroic mirror 1232 in the optical path of the blue light LB. The relay lens 1236 and the relay lens 1237 compensate for an optical loss of the blue light LB which is attributable to the optical path length of the blue light LB being larger than the optical path length of the red light LR or the green light LG.

The liquid crystal panel 124R, the liquid crystal panel 124G, and the liquid crystal panel 124B modulate the red light LR, the green light LG, and the blue light LB, respectively, in accordance with the video signal. As the liquid crystal panel 124R, the liquid crystal panel 124G, and the liquid crystal panel 124B, for example, a light-transmissive liquid crystal panel is used. A field lens 1238 for collimating incident light is provided on the incident side of the liquid crystal panel 124. The beams of light modulated by the liquid crystal panel 124R, the liquid crystal panel 124G, and the liquid crystal panel 124B are synthesized by a cross dichroic prism 1239.

The projection optical system 125 includes at least one projection lens, and may further include a mirror and a prism. The projection optical system 125 projects the light synthesized by the cross dichroic prism 1239 onto the screen SC.

In this example, the optical sensor 16 includes an R sensor 161 and a B sensor 162. The R sensor 161 is a sensor that measures the illuminance of the red light LR. The B sensor 162 is a sensor that measures the illuminance of the blue light LB. In this example, the R sensor 161 is provided at the rear of the reflection mirror 1233. The rear of the reflection mirror 1233 refers to the reverse side of a surface on which the red light LR is incident in the reflection mirror 1233. The reflection mirror 1233 transmits the red light LR at a predetermined ratio. The R sensor 161 measures this transmitted light. The B sensor 162 is provided at the rear of the reflection mirror 1235. The reflection mirror 1235 transmits the blue light LB at a predetermined ratio. The B sensor 162 measures this transmitted light.

Figure 3:
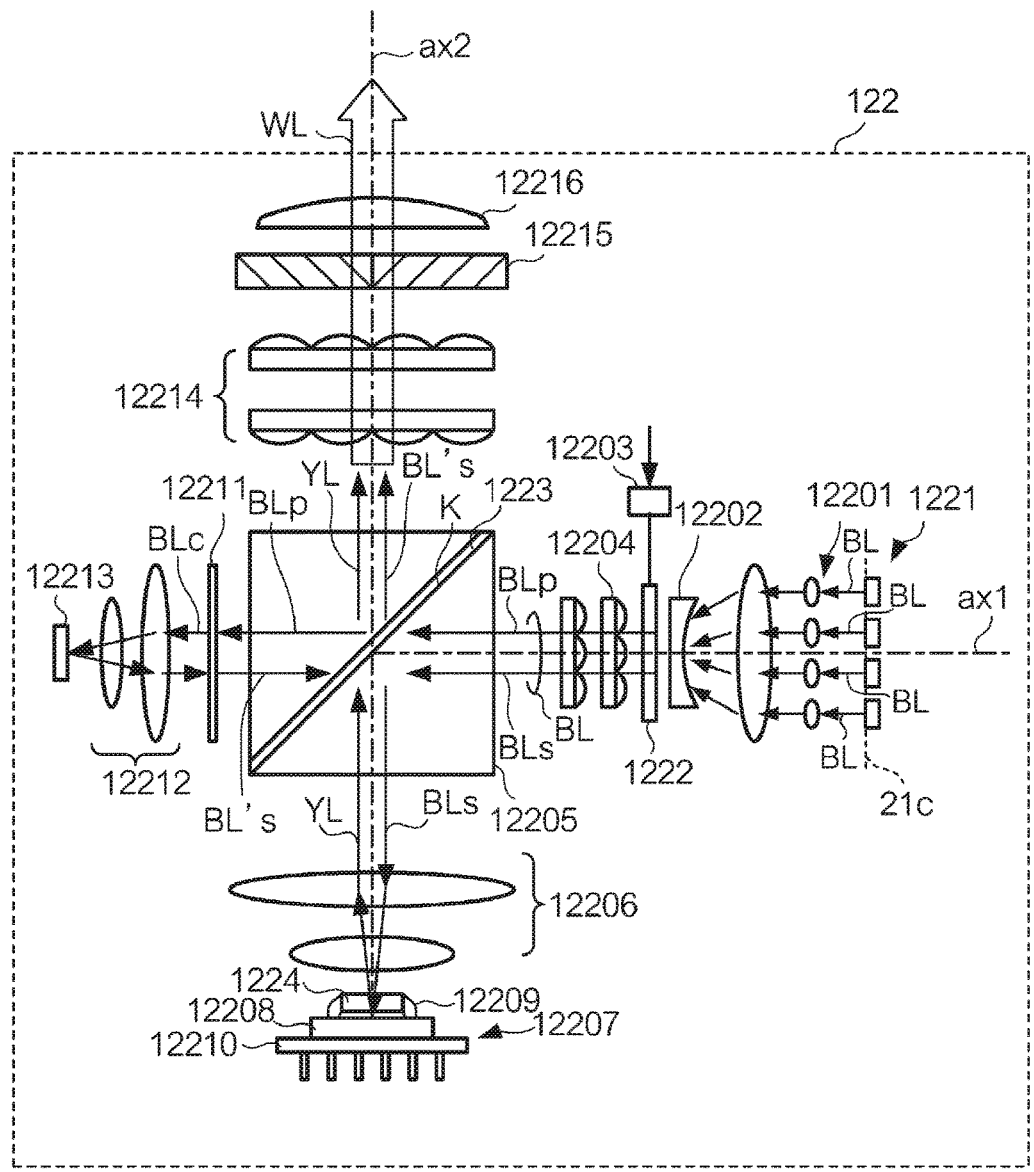
FIG. 3 is a diagram illustrating a configuration of a light source.

FIG. 3 is a diagram illustrating a configuration of the light source 122. Here, the principle of the light source 122 will be first described before its detailed structure. The light source 122 includes a laser diode (LD) array 1221, a retardation plate 1222, a polarization separation element 1223, and a phosphor 1224. The LD array 1221 is an example of a light-emitting element that outputs light of a specific wavelength band (for example, light of a wavelength band equivalent to blue having a peak wavelength of 446 nm; hereinafter, referred to as "B light"), and includes a plurality of laser diodes disposed in an array, in this example. The light which is output from the LD array 1221 is S-polarized light (an example of a first polarization state). The retardation plate 1222 is an example of a retardation plate that converts a portion of light output from the light-emitting element which is appropriate to a rotation angle into a second polarization state. Specifically, the retardation plate 1222 converts a portion of S-polarized light which is output from the LD array 1221 into P-polarized light (an example of the second polarization state). The ratio of conversion into the P-polarized light out of the light which is output from the LD array 1221 (that is, ratio of the S-polarized light to the P-polarized light) changes depending on the angle of the retardation plate 1222 with respect to incident light. The angle of the LD array 1221 with respect to incident light (hereinafter, referred to as the "rotation angle") is controlled by a motor 12203. In the meaning that the rotation angle is made variable by the motor 12203, the retardation plate 1222 is referred to as rotating retardation plate.

The polarization separation element 1223 separates the light which is output from the retardation plate 1222 into two fluxes of light in accordance with a polarization state. The polarization separation element 1223 is an example of a polarization separation element that separates the light from the retardation plate into a first flux of light of the first polarization state and a second flux of light of the second polarization state. In this example, the polarization separation element 1223 reflects the S-polarized light, and transmits the P-polarized light. The light (an example of a first flux of light) reflected by the polarization separation element 1223 is incident on the phosphor 1224. The phosphor 1224 is excited by light of a first wavelength band, and outputs light (an example of a third flux of light; hereinafter, referred to as "Y light") of a second wavelength band (for example, wavelength band equivalent to yellow) different from the first wavelength band. The B light (an example of the second flux of light) having passed through the polarization separation element 1223 is finally synthesized with the Y light having output from the phosphor 1224, and is output to the outside of the light source 122, as white light including components of a plurality of wavelength bands.

As can be seen from the above description, the S-polarized light out of the light which is output from the LD array 1221 is converted into the Y light, the P-polarized light remains the B light, and both are finally synthesized. A change in the ratio of the S-polarized light to the P-polarized light due to the rotation angle of the retardation plate 1222 refers to a change in the ratio of the Y light to the B light due to the rotation angle of the retardation plate 1222. That is, in the light source 122, a balance between the Y light and the B light (hereinafter, referred to as a "color balance") can be adjusted.

Hereinafter, the specific configuration example of the light source 122 will be described. The B light which is output from the LD array 1221 is incident on a collimator optical system 12201. The collimator optical system 12201 converts the B light which is output from the LD array 1221 into a parallel flux of light. The collimator optical system 12201 is constituted by, for example, a plurality of collimator lenses disposed side by side in an array. The plurality of collimator lenses are disposed corresponding to a plurality of laser diodes.

The B light which is output from the collimator optical system 12201 is incident on an afocal optical system 12202. The afocal optical system 12202 adjusts the light flux diameter of the B light. In this example, the afocal optical system 12202 is constituted by, for example, two afocal lenses.

The B light which is output from the afocal optical system 12202 is incident on the retardation plate 1222. The retardation plate 1222 is constituted by a ½-wavelength plate for the B light (wavelength of 446 nm in this example). The optical axis of the retardation plate 1222 intersects the polarization axis of the B light which is incident on the retardation plate 1222. The optical axis of the retardation plate 1222 may be either the phase advance axis or the phase lag axis of the retardation plate 1222. The B light which is incident on the retardation plate 1222 is coherent S-polarized light. The B light having passed through the retardation plate 1222 serves as light having an S polarization component BLs and a P polarization component BLp mixed with each other at a predetermined ratio. The motor 12203 for rotating the retardation plate 1222 is connected to the retardation plate 1222. The motor 12203 is, for example, a stepping motor.

The B light which is output from the retardation plate 1222 is incident on a homogenizer optical system 12204. The homogenizer optical system 12204 converts the light intensity distribution of the B light into uniform light intensity distribution called, for example, top hat-type distribution. In this example, the homogenizer optical system 12204 is constituted by two multi-lens arrays.

The B light which is output from the homogenizer optical system 12204 is incident on a prism 12205. The prism 12205 is constituted by, for example, a dichroic prism having wavelength selectivity. The dichroic prism has an inclined surface K at an angle of 45° to an optical axis ax1. The inclined surface K is at an angle of 45° to an optical axis ax2. The prism 12205 is disposed so that the point of intersection between the optical axis ax1 and the optical axis ax2 orthogonal to each other and the optical center of the inclined surface K are coincident with each other. A parallel plate-like dichroic mirror may be used instead of the prism 12205. The optical axis ax1 and the optical axis ax2 are flush with each other, and have a positional relationship in which these axes are orthogonal to each other.

The polarization separation element 1223 having wavelength selectivity is provided on the inclined surface K. The polarization separation element 1223 separates the B light into the S polarization component BLs and the P polarization component BLp. Specifically, the polarization separation element 1223 reflects the S polarization component BLs, and transmits the P polarization component BLp. The S polarization component BLs reflected by the polarization separation element 1223 is used for the excitation of the phosphor 1224, and thus is hereinafter referred to as excitation light BLs. The P polarization component BLp having passed through the polarization separation element 1223 is simply referred to as the B light.

The excitation light BLs which is output from the polarization separation element 1223 is incident on the pickup optical system 12206. The pickup optical system 12206 condenses the excitation light BLs in the phosphor 1224 of a fluorescent element 12207. The pickup optical system 12206 is constituted by two pickup lenses in this example. The fluorescent element 12207 includes the phosphor 1224 and a substrate 12208. The substrate 12208 supports the phosphor 1224. When the excitation light BLs is incident, the phosphor 1224 is excited, and fluorescent light is output. The fluorescent light is light (referred to as the Y light since this light is light of a wavelength band of yellow in this example) which is different in wavelength from the excitation light BLs. The phosphor 1224 is fixed to the substrate 12208 by an adhesive 12209 provided between the lateral side of the phosphor 1224 and the substrate 12208, in a state where a surface on the opposite side to a side where the excitation light BLs is incident is brought into contact with the substrate 12208. A heat sink 12210 for dissipating heat of the phosphor 1224 is provided on the surface of the substrate 12208 on the opposite side to a side where the phosphor 1224 is provided.

Since the Y light which is output from the phosphor 1224 is non-polarized light of which the polarization direction is not aligned, the light passes through the pickup optical system 12206, and then is incident on the polarization separation element 1223 while remaining in a state of non-polarization. The polarization separation element 1223 transmits fluorescent light different in wavelength band from the B light, regardless of the polarization state of the Y light.

On the other hand, the B light which is output from the polarization separation element 1223 is incident on a retardation plate 12211. The retardation plate 12211 is constituted by, for example, a ¼-wavelength plate. The retardation plate 12211 converts the polarization state of the B light into circular polarization. The B light which is output from the retardation plate 12211 is incident on a pickup optical system 12212. The pickup optical system 12212 condenses the B light in a diffusion and reflection element 12213. The pickup optical system 12212 is constituted by two pickup lenses in this example.

The diffusion and reflection element 12213 diffuses and reflects the B light. As the diffusion and reflection element 12213, it is preferable to use an element that performs Lambertian reflection on incident light. It is possible to obtain the B light having a uniform illuminance distribution by using such a diffusion and reflection element. The B light diffused and reflected by the diffusion and reflection element 12213 is incident on the retardation plate 12211 again, and is converted from circularly polarized light to S-polarized light. The B light which is output from the retardation plate 12211 is reflected from the polarization separation element 1223.

The polarization separation element 1223 outputs the Y light and the B light, as a result, in the same direction. That is, the polarization separation element 1223 also functions as a synthesis element that synthesizes the Y light and the B light. The light which is output from the polarization separation element 1223 is referred to as illumination light.

The illumination light which is output from the polarization separation element 1223 is incident on an integrator optical system 12214. The integrator optical system 12214 divides the illumination light WL into a plurality of small fluxes of light. The integrator optical system 12214 is constituted by two lens arrays in this example. The lens array has a configuration in which a plurality of microlenses are disposed in an array.

The illumination light which is output from the integrator optical system 12214 is incident on the polarization conversion element 12215. The polarization conversion element 12215 is used to align the polarization direction of the illumination light WL. The polarization conversion element 12215 is constituted by, for example, a polarization separation film, a retardation plate, and a mirror. In order to align the polarization direction of the Y light which is non-polarized light and the polarization direction of the B light which is S-polarized light, the polarization conversion element 12215 converts one polarization component into the other polarization component, for example, a P polarization component into an S polarization component. A superposition lens 12216 superposes a plurality of small fluxes of light emitted from the polarization conversion element 12215 on an object to be illuminated.

Reference will be made to FIG. 1 again. The UI unit 13 receives an input of an instruction from a user. Here, particularly, an input of an instruction for setting the brightness of the light source 122 is received. The UI unit 13 outputs brightness information which is set in accordance with a user's instruction input. The optical sensor 16 measures the illuminance of light after separation, in the optical system 12 (particularly, illumination optical system 123). The temperature sensor 17 is a sensor for measuring the temperature of the light source 122, and is provided in the vicinity of the light source 122. The light source information storage unit 15 stores information relating to the input and output characteristics of the light source 122 (hereinafter, referred to as "light source information").

The light source control unit 14 controls the light source 122 (through the light source drive unit 121). More specifically, the light source control unit 14 controls a color balance of the light source 122. The control of the color balance is performed on the basis of the brightness information. The brightness information refers to information for setting the brightness of light which is output from the light source 122, and refers to information directly or indirectly indicating the brightness of light which is output from the light source 122. In this example, the pieces of brightness information are independently provided from the image analysis unit 112, the UI unit 13, and the temperature sensor 17. Although a detailed description will be given later, the light source control unit 14 uses information obtained by integrating the plurality of pieces of brightness information, and controls the color balance of the light source 122. In a case where the pieces of brightness information before and after integration are distinguished from each other, the brightness information before integration is referred to as "individual brightness information", and the brightness information after integration is referred to as "integrated brightness information". The "individual pieces of brightness information" include information supplied from the image analysis unit 112 (referred to as "brightness information (video)"), information supplied from the UI unit 13 (referred to as "brightness information (UI)"), and information supplied from the temperature sensor 17 (referred to as "brightness information (temperature)"). When the pieces of individual brightness information and the pieces of integrated brightness information are not distinguished from each other, these pieces of information are simply referred to as brightness information.

Figure 4:
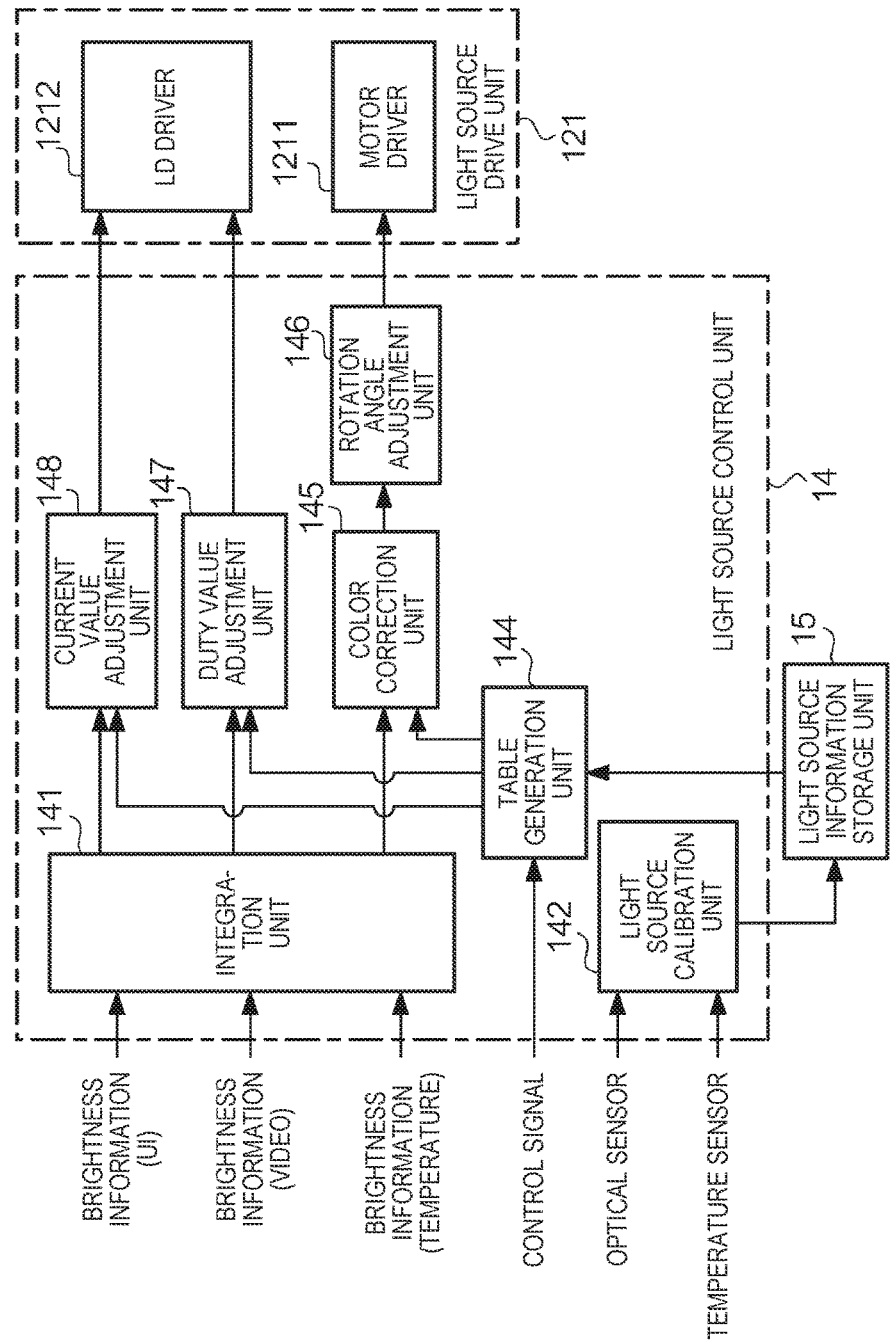
FIG. 4 is a diagram illustrating a functional configuration of a light source control unit according to the first embodiment.

FIG. 4 is a diagram illustrating a functional configuration of the light source control unit 14 according to the first embodiment. The light source control unit 14 includes an integration unit 141, a light source calibration unit 142, a light source information storage unit 15, a table generation unit 144, a color correction unit 145, a rotation angle adjustment unit 146, a duty value adjustment unit 147, and a current value adjustment unit 148.

The integration unit 141 integrates a plurality of pieces of individual brightness information with each other, and generates integrated brightness information. The information which is output from the image analysis unit 112 is, for example, information indicating the type of video, but the integration unit 141 converts the information indicating the type of video into brightness information in accordance with a predetermined rule (for example, a movie is 80%, sports broadcast is 90%, and a presentation image is 100%). In addition, the information which is output from the temperature sensor 17 is information indicating the temperature of the light source 122 (hereinafter, referred to as "temperature information"), but the integration unit 141 converts the temperature information into the brightness information in accordance with a predetermined rule. That is, the integration unit 141 functions as a setting unit that sets the brightness information on the basis of an output of the image analysis unit 112 or the temperature sensor 17. Further, as described later, the light source information stored in the light source information storage unit 15 is obtained on the basis of the output value of the optical sensor 16, and thus the integration unit 141 functions as a setting unit that sets the brightness information on the basis of an output of the optical sensor 16. The integrated brightness information is used in the color correction unit 145, the duty value adjustment unit 147, and the current value adjustment unit 148.

The color correction unit 145 performs color correction, that is, adjustment of a color balance on the basis of the integrated brightness information. The color correction unit 145 stores a table (color correction table) in which brightness and a correction value of the color balance are associated with each other. When the integrated brightness information is input, the color correction unit 145 refers to this table, and outputs a correction value corresponding to the integrated brightness information which is input.

The rotation angle adjustment unit 146 converts the correction value of the color balance into the rotation angle of the retardation plate 1222. The rotation angle adjustment unit 146 stores a table (retardation plate table) in which the correction value of the color balance and the rotation angle of the retardation plate 1222 are associated with each other. In this example, the retardation plate 1222 is rotated by the motor 12203 which is a stepping motor, and thus the step value of the motor is stored as information equivalent to the rotation angle of the retardation plate 1222. When the correction value of the color balance is input, the rotation angle adjustment unit 146 outputs a step value corresponding to the input correction value. This step value is input to a motor driver 1211 of the light source drive unit 121. The motor driver 1211 drives the motor 12203 in accordance with a signal supplied from the rotation angle adjustment unit 146. The motor driver 1211 is an example of a retardation plate control unit that controls the rotation angle of the retardation plate 1222 in accordance with the brightness information.

The duty value adjustment unit 147 adjusts a duty value on the basis of the integrated brightness information. The duty value refers to a duty value (duty ratio) in pulse width modulation (PWM) control. The duty value adjustment unit 147 stores a table (duty value table) in which the brightness and the duty value are associated with each other. When the integrated brightness information is input, the duty value adjustment unit 147 refers to this table, and outputs a duty value corresponding to the integrated brightness information which is input.

The current value adjustment unit 148 adjusts a current value on the basis of the integrated brightness information. The current value adjustment unit 148 stores a table (current value table) in which the brightness and the current value are associated with each other. When the integrated brightness information is input, the current value adjustment unit 148 refers to this table, and outputs a current value corresponding to the integrated brightness information which is input. The duty value and current value are input to an LD driver 1212 of the light source drive unit 121. The LD driver 1212 drives the LD array 1221 in accordance with signals supplied from the duty value adjustment unit 147 and the current value adjustment unit 148. The LD driver 1212 is an example of a light-emitting element control unit that controls the brightness of the LD array 1221 in accordance with the brightness information.

The light source calibration unit 142 acquires information relating to the input and output characteristics of the light source 122 (hereinafter, referred to as "light source information"). The input and output characteristics indicate how the brightness of the illumination light which is output from the light source 122 changes with respect to the current value to be supplied. The light source calibration unit 142 acquires the light source information from output signals of the optical sensor 16 and the temperature sensor 17. The light source calibration unit 142 stores the acquired light source information in the light source information storage unit 15. The table generation unit 144 uses the light source information stored in the light source information storage unit 15, to update (rewrite) the tables stored in the color correction unit 145, the duty value adjustment unit 147, and the current value adjustment unit 148.

The functions of the UI unit 13, the light source control unit 14, and the image analysis unit 112 among the constituent elements of FIGS. 1 and 4 are provided in, for example, a central processing unit (CPU). Alternatively, these functions may be provided in a dedicated processor. In addition, the function of the light source information storage unit 15 is provided in a rewritable non-volatile memory (for example, flash memory).

1-2. Operation 1-2-1. Update of Color Correction Table

Figure 5:
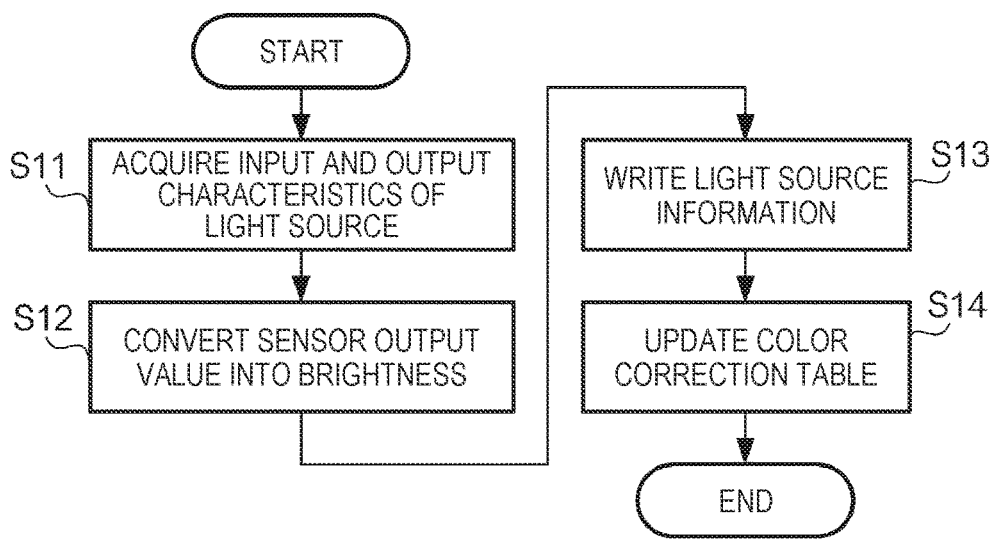
FIG. 5 is a flow diagram illustrating an update process of a color correction table.

FIG. 5 is a flow diagram illustrating an update process of the color correction table. The update process of the color correction table is started at a predetermined timing, for example, at the time of power-off after a time elapsed after the color correction table has previously been updated exceeds a threshold. Alternatively, the update process of the color correction table may be started by a user's instruction.

In step S11, the light source calibration unit 142 acquires the input and output characteristics of the light source. The input and output characteristics of the light source refers to, for example, information indicating a change in the output value of the optical sensor 16 with respect to the current value to be supplied to the LD array 1221. The current to be supplied to the LD array 1221 is referred to as a "drive current", and the value of the drive current is referred to as a "drive current value". The light source calibration unit 142 controls the light source drive unit 121, and sequentially changes the drive current value. The light source calibration unit 142 records a sensor output value from the optical sensor 16 in each drive current value.

Figure 6:
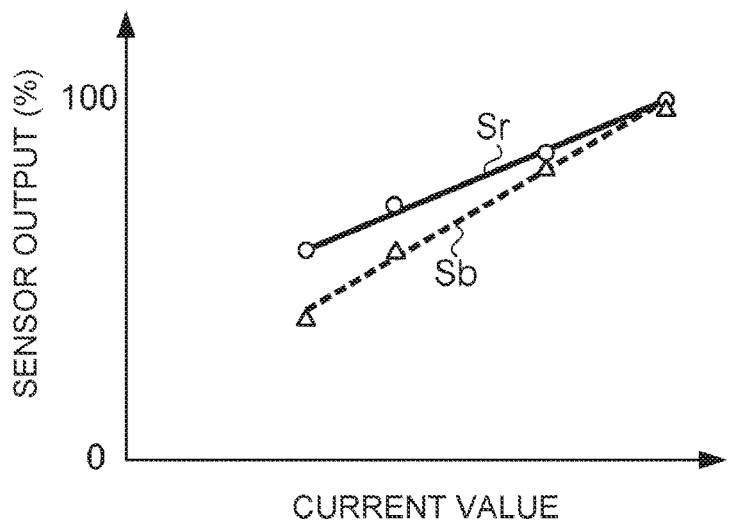
FIG. 6 is a diagram illustrating the input and output characteristics of a light source.

FIG. 6 is a diagram illustrating the input and output characteristics of the light source. In this drawing, the horizontal axis represents a drive current value, and the vertical axis represents a sensor output value. The sensor output value is indicated by a relative value standardized based on a reference value. An example of the reference value to be used includes a maximum value of the sensor output value (sensor output value during a maximum drive current) in input and output characteristics newly measured in this time. The reference value (that is, reference value of the color balance) of a ratio between maximum output values (absolute values rather than relative values) of the R sensor 161 and the B sensor 162 is stored in the light source information storage unit 15, and one of the sensor output values of the R sensor 161 and the B sensor 162 is further standardized in accordance with this reference value. For example, in the following conditions:

R sensor maximum output value=5.0
B sensor maximum output value=3.6
R sensor maximum output value: B sensor maximum output value=5:4
standardization is made as follows:
R sensor maximum output value=100%
B sensor maximum output value=90%.

An example of the reference value of the color balance to be used includes an initial value measured at the time of the factory shipment or a design value determined on design. Alternatively, a value obtained by multiplying the initial value or the design value by a coefficient depending on color modes may be used as the reference value of the color balance. The color mode refers to one of parameters for setting the color balance in the projector 1. For example, the color modes are distinguished from each other in accordance with the viewing environment (brightness or darkness of a room) or the type of video (movie or television program), and a suitable color balance is set in advance for each color mode.

In FIG. 6, an output value Sr indicates an output value of the R sensor 161, and an output value Sb indicates an output value of the B sensor 162. In the example of this drawing, plots in the graph are measurement points, and the straight line indicates a regression line. Even in a case where the LD array 1221 is supplied with the same drive current, the illuminances of light to be output are not the same as each other, and change due to a deterioration in an element associated with the temperature or use. Specifically, due to a rise in a threshold current (lower limit of a current capable of laser oscillation) associated with the deterioration, illuminance after change over time becomes lower as the current becomes lower. On the other hand, the phosphor 1224 has the characteristics of a change in conversion efficiency due to the intensity of excitation light, for example, the characteristics of an increase in conversion efficiency as the brightness of the excitation light becomes lower. For this reason, in a case where the illuminance of laser light to be output when the LD array 1221 is supplied with a certain drive current becomes lower, the Y light tends to become relatively more intensive than the B light. In addition, in the phosphor 1224, even in a case where excitation light of the same illuminance is incident, the illuminance of fluorescent light to be output may change due to a deterioration in an element associated with the temperature or use.

Reference will be made to FIG. 5 again. In step S12, the light source calibration unit 142 converts the sensor output value into brightness. The conversion from the sensor output value to brightness is performed, for example, by inputting both the output value of the R sensor 161 and the output value of the B sensor 162 into a predetermined relational expression. Alternatively, in a simple manner, the output value of the R sensor 161 may be replaced with brightness. In addition, a value obtained by performing a predetermined correction process on the output value of the R sensor 161 may be set to brightness. The R sensor 161 indirectly measures the illuminance of the Y light, but this is because contribution to brightness is larger in the Y light than in the B light, in terms of human vision.

In step S13, the light source calibration unit 142 writes the light source information in the light source information storage unit 15. The light source information to be written herein is information indicating a change in brightness with respect to the drive current value. In this manner, the light source information is updated at any time, and thus it is possible to perform correction according to the input and output characteristics of the LD array 1221 at the point in time.

Figure 7:
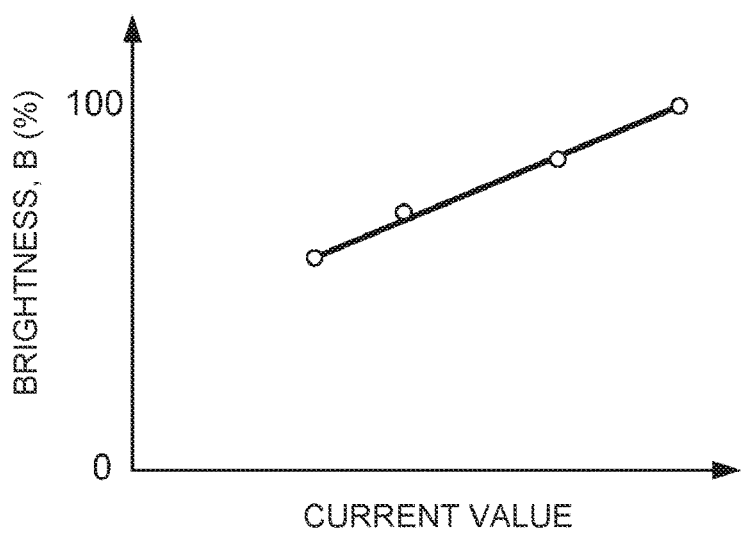
FIG. 7 is a diagram illustrating light source information.

FIG. 7 is a diagram illustrating the light source information. In this example, the output value of the R sensor 161 is used as brightness, and the shape of a graph is the same as that of the output value Sr in FIG. 6. The light source information to be written may be a set of coordinates of points equivalent to measurement points, and may be information (for example, inclination and intercept) for specifying a regression line. In addition, approximate curves other than the regression line may be used.

Reference will be made to FIG. 5 again. When an instruction for generating the color correction table is given by a control signal, the table generation unit 144 generates (updates) the color correction table (step S14). The details are as follows. The table generation unit 144 uses information stored in the light source information storage unit 15, to calculate a correction value C of the color balance in accordance with the following Expression (1).

$$C(B)=Rs(B)/Rm(B) \qquad (1)$$

$$(Rm(B)=Sb(B)/Sr(B))$$

C(B) indicates a correction value when brightness is B, Rs(B) indicates a target value of the color balance when brightness is B, Rm(B) indicates a color balance based on real measurement when brightness is B, Sb(B) indicates an output value of the B sensor 162 when brightness is B, and Sr(B) indicates an output value of the R sensor 161 when brightness is B. As obvious from such a definition, the correction value C becomes smaller as the illuminance of the B light becomes higher than that of the Y light. The correction value C is calculated by Expression (1) with respect to a plurality of brightnesses B, and thus a relationship between the correction value C and the brightness B is obtained.

Figure 8:
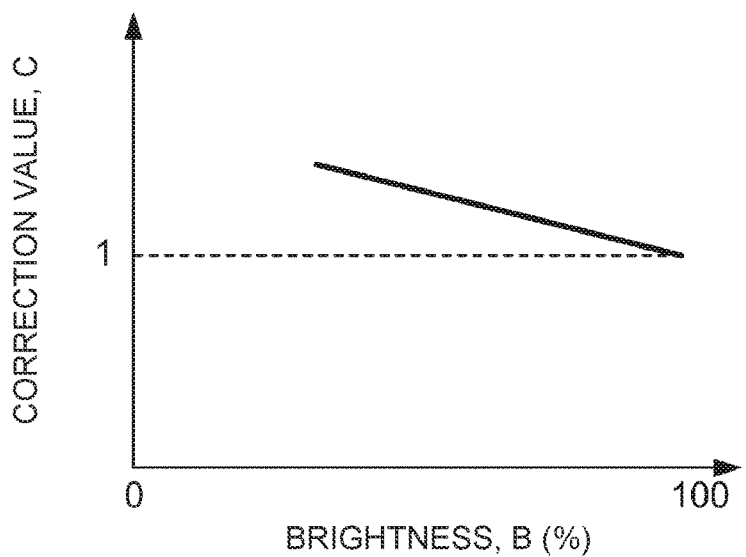
FIG. 8 is a diagram illustrating a relationship between a correction value and brightness.

FIG. 8 is a diagram illustrating a relationship between the correction value C and the brightness B. In this drawing, the horizontal axis represents brightness, and the vertical axis represents the correction value C of the color balance. The table generation unit 144 updates the color correction table by writing data, obtained by tabling the relationship between the correction value C and the brightness B, in the color correction unit 145.

According to the present embodiment, the color correction table is updated at any time in accordance with the state of the light source 122 (specifically, LD array 1221 and phosphor 1224). Although a detailed description will not be given, the table generation unit 144 updates the duty value table and the current value table similarly on the basis of the light source information.

1-2-2. Rotation Angle Control of Retardation Plate

Figure 9:
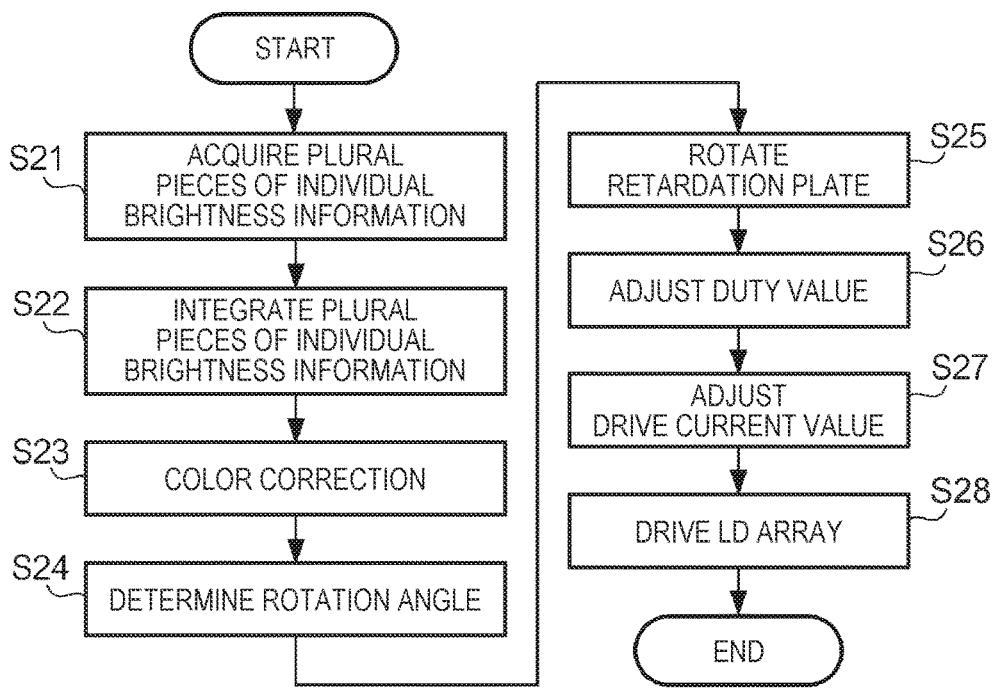
FIG. 9 is a flow diagram of a rotation angle control process of a retardation plate.

FIG. 9 is a flow diagram illustrating a rotation angle control process of the retardation plate. The rotation angle control process of the retardation plate is executed at a predetermined timing, for example, every time pieces of individual brightness information are updated, or for each frame of video indicated by a video signal. Alternatively, the rotation angle control process of the retardation plate may be started by a user's instruction.

In step S21, the integration unit 141 acquires the pieces of individual brightness information. In this example, the integration unit 141 acquires the brightness information (video), the brightness information (UI), and the brightness information (temperature).

In step S22, the integration unit 141 integrates a plurality of pieces of individual brightness information, and generates integrated brightness information. In this example, the brightness information (video), the brightness information (UI), and the brightness information (temperature) are all indicated by percentage, and the integrated brightness information is generated by multiplying these three pieces of brightness information. A method of obtaining the integrated brightness information from the pieces of individual brightness information is not limited thereto, and the integrated brightness information may be generated, for example, by performing weighted multiplication or weighted addition on the pieces of individual brightness information.

When the integrated brightness information is input from the integration unit 141, the color correction unit 145 performs color correction (step S23). Specifically, the color correction unit 145 refers to the stored color correction table (FIG. 8), and outputs a correction value C corresponding to the integrated brightness information which is input. When the correction value C is input from the color correction unit 145, the rotation angle adjustment unit 146 determines a rotation angle (step S24).

Figure 10:
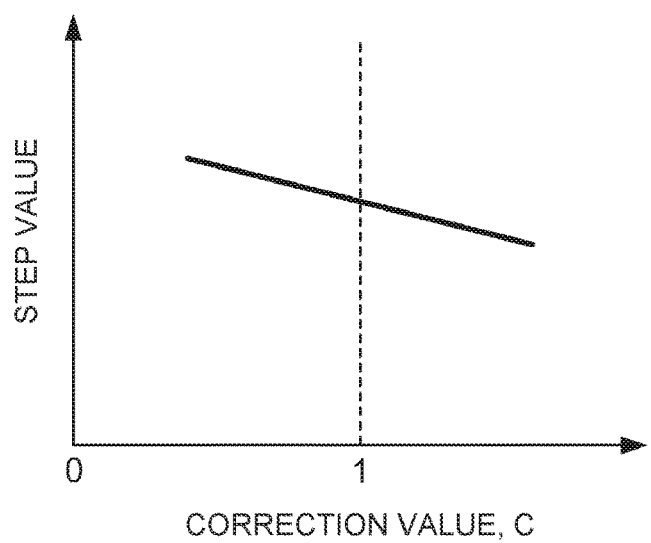
FIG. 10 is a diagram illustrating information indicated by a retardation plate table.

FIG. 10 is a diagram illustrating information indicated by the retardation plate table. In this drawing, the horizontal axis represents a correction value C, and the vertical axis represents a step value of the motor 12203. The rotation angle adjustment unit 146 refers to this retardation plate table, and reads out a step value corresponding to the correction value C. The rotation angle adjustment unit 146 outputs this step value to the motor driver 1211. When the step value is input, the motor driver 1211 controls the motor 12203 in accordance with the input step value. That is, the rotation angle of the retardation plate 1222 is adjusted to a desired value (step S25).

In order to adjust the color balance in accordance with brightness settings, it is also considered, for example, to prepare a retardation plate table in advance for each brightness setting, and to adjust the rotation angle of the retardation plate 1222 with reference to a corresponding retardation plate table in accordance with the brightness settings. However, in such a method, the projector 1 is required to hold a large amount of data, which leads to complicated results. According to the present embodiment, it is possible to adjust the color balance in accordance with the brightness information. That is, it is possible to adjust the color balance in accordance with each of a plurality of brightness settings. In addition, in the present embodiment, since the color balance is adjusted in accordance with the light source information of the light source 122 changing at any time, it is possible to cope with even a change in the light source 122 over time.

When the integrated brightness information is input from the integration unit 141, the duty value adjustment unit 147 adjusts a duty value (step S26). The duty value adjustment unit 147 stores a table (hereinafter, referred to as a "duty value table") in which the brightness of the light source 122 and the duty value are associated with each other (not shown). The duty value adjustment unit 147 refers to this duty value table, and reads out a duty value corresponding to the integrated brightness information. The duty value adjustment unit 147 outputs this duty value to the LD driver 1212.

When the integrated brightness information is input from the integration unit 141, the current value adjustment unit 148 adjusts a drive current value (step S27). The current value adjustment unit 148 stores a table (hereinafter, referred to as a "current value table") in which the brightness of the light source 122 and the drive current value are associated with each other (not shown). The current value adjustment unit 148 refers to this current value table, and reads out a current value corresponding to the integrated brightness information. The current value adjustment unit 148 outputs this current value to the LD driver 1212.

The LD driver 1212 drives the LD array 1221 in accordance with the input duty value and current value (step S28). That is, the illuminance of light which is output from the LD array 1221 is adjusted.

2. Second Embodiment

Figure 11:
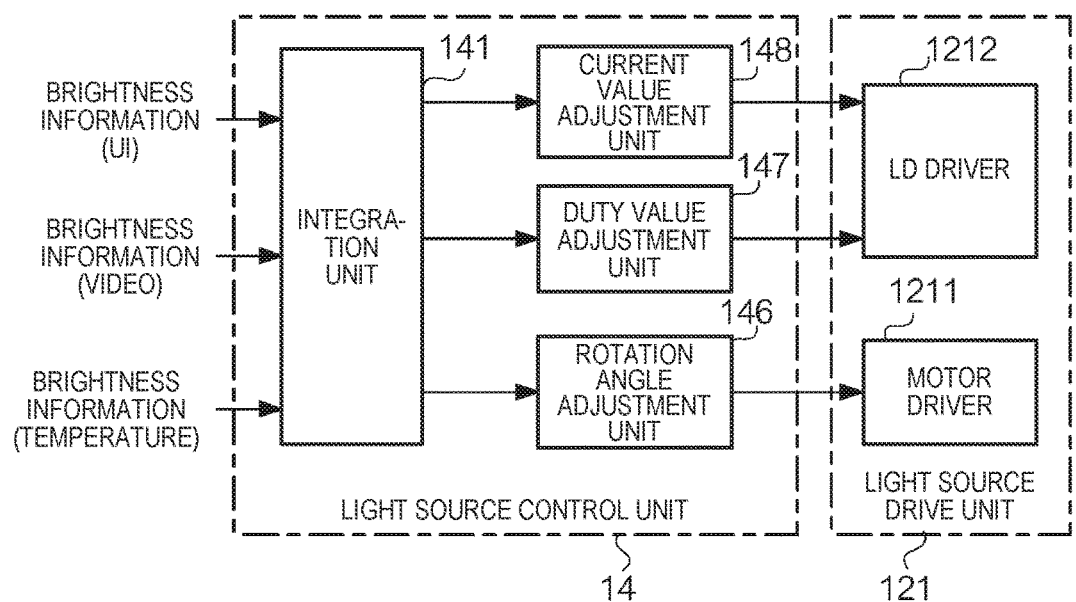
FIG. 11 is a diagram illustrating a configuration of a light source control unit according to a second embodiment.

FIG. 11 is a diagram illustrating a configuration of a light source control unit 14 according to a second embodiment. Hereinafter, a description will be given with a focus on differences from the light source control unit 14 in the first embodiment. In this example, a configuration relating to the color correction in the light source control unit 14 according to the first embodiment is omitted. The light source control unit 14 according to the second embodiment is suitable for a case where a deterioration in the light source 122 over time may not be considered, or a case where the deterioration over time is small enough to be negligible.

In this example, the rotation angle adjustment unit 146 converts the integrated brightness information into the rotation angle of the retardation plate 1222. The rotation angle adjustment unit 146 stores a table (retardation plate table according to the second embodiment) in which the brightness and the rotation angle of the retardation plate 1222 are associated with each other.

Figure 12:
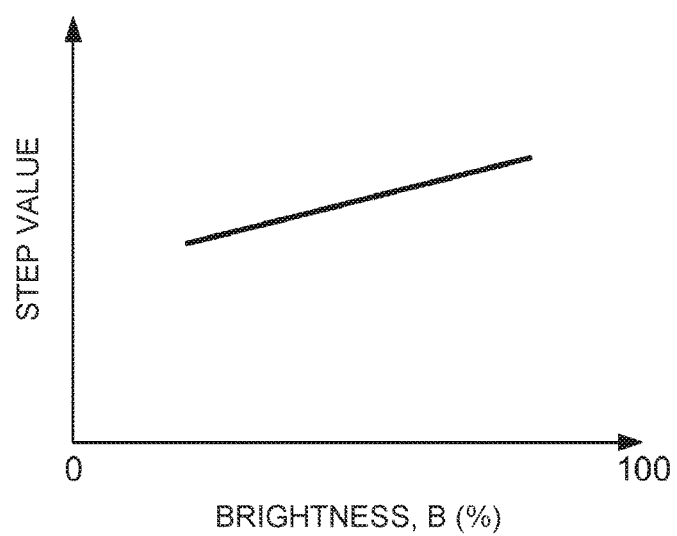
FIG. 12 is a diagram illustrating information indicated by a retardation plate table according to the second embodiment.

FIG. 12 is a diagram illustrating information indicated by the retardation plate table according to the second embodiment. In this drawing, the horizontal axis represents brightness B, and the vertical axis represents a step value of the motor 12203. The rotation angle adjustment unit 146 refers to this retardation plate table, and reads out a step value corresponding to the brightness B. The rotation angle adjustment unit 146 outputs this step value to the motor driver 1211. When the step value is input, the motor driver 1211 controls the motor 12203 in accordance with the input step value.

According to the present embodiment, the rotation angle of the retardation plate 1222 is controlled, using a simpler configuration, in accordance with the brightness information. That is, it is possible to adjust the color balance in accordance with the brightness information. In this example, the light source information storage unit 15, the optical sensor 16, and the temperature sensor 17 are not required.

3. Third Embodiment

Figure 13:
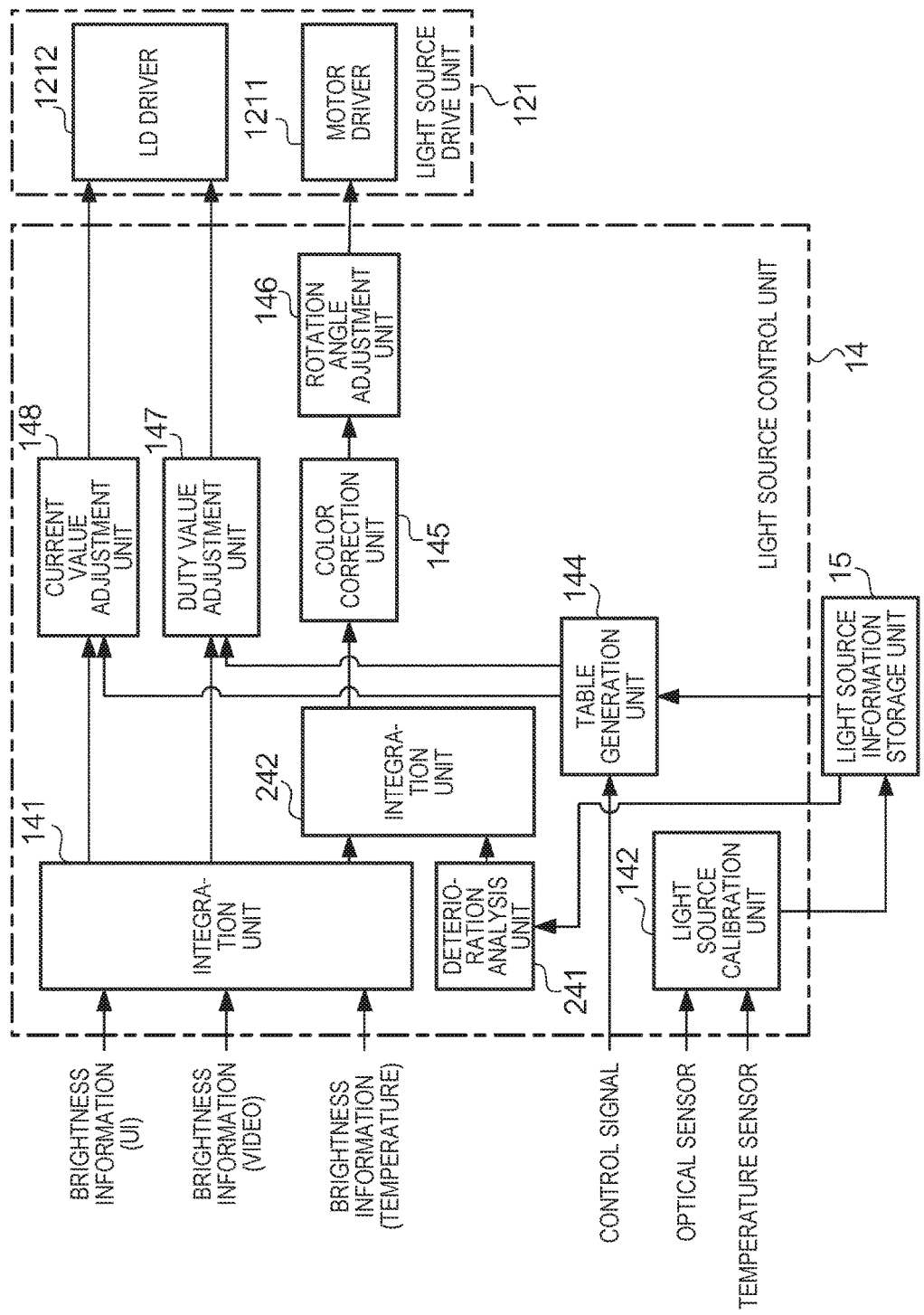
FIG. 13 is a diagram illustrating a configuration of a light source control unit according to a third embodiment.

FIG. 13 is a diagram illustrating a configuration of a light source control unit 14 according to a third embodiment. Hereinafter, a description will be given with a focus on differences from the light source control unit 14 in the first embodiment. The light source control unit 14 according to the third embodiment includes a deterioration analysis unit 241 and an integration unit 242, in addition to the configuration of the light source control unit 14 according to the first embodiment.

The deterioration analysis unit 241 analyzes the deterioration state of the light source 122. In this example, the deterioration analysis unit 241 analyzes the deterioration state from the light source information, more specifically, from the output value of the R sensor 161 at a predetermined drive current value.

Figure 14:
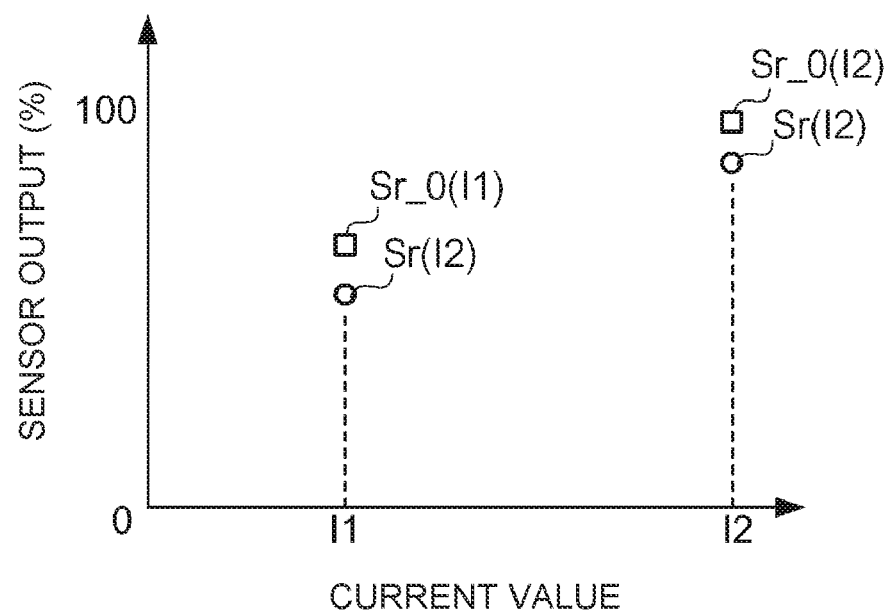
FIG. 14 is a diagram illustrating an output value of an R sensor used for an analysis of a deterioration state.

FIG. 14 is a diagram illustrating the output value of the R sensor 161 which is used for an analysis of the deterioration state. In this drawing, an output value Sr_O indicates a reference value of the output value. An example of the reference value to be used includes a sensor output value measured at the time of the factory shipment or a design value. The deterioration analysis unit 241 or the light source information storage unit 15 stores the reference value of the output value. In this example, the sensor output value is measured at two points of a relatively low drive current value I1 and a high drive current value I2. The deterioration analysis unit 241 calculates a deterioration coefficient β indicating the deterioration state of the light source 122 from these sensor output values. The deterioration coefficient β is calculated in accordance with, for example, the following Expression (2).

$$\beta = \{Sr(I1)/Sr\_O(I1) + Sr(I2)/Sr\_O(I2)\}/2 \quad (2)$$

A method of calculating the deterioration coefficient β is not limited to Expression (2). For example, the deterioration coefficient β may be calculated using the sensor output value at the drive current value on one specific point.

The integration unit 242 integrates the integrated brightness information which is output from the integration unit 141 and the deterioration coefficient which is output from the deterioration analysis unit 241. Specifically, the integration unit 242 multiplies the integrated brightness information and the deterioration coefficient β together. By multiplying the deterioration coefficient β, the integrated brightness information is equivalent to the brightness information considering a deterioration in the light source 122, in addition to the brightness settings. The integration unit 242 outputs the integrated brightness information multiplied by the deterioration coefficient β to the color correction unit 145. The color correction unit 145 performs the color correction on the basis of the brightness information which is input from the integration unit 242.

According to the present embodiment, it is possible to adjust the color balance in consideration of a change (deterioration) from the reference state of the light source 122. In this example, the B sensor 162 is not required.

4. Modification Example

The invention is not limited to the above-described embodiment, and can be variously modified. Hereinafter, some modification examples will be described. Two or more modification examples among the following ones may be used in combination therewith.

Pieces of brightness information to be considered are not limited to those illustrated in the embodiments. For example, at least one of the brightness information (video), the brightness information (UI), and the brightness information (temperature) may be omitted. Alternatively, pieces of brightness information other than these three may be used.

The brightness information (temperature) is not limited to those obtained from the output value of the temperature sensor 17. Insofar as information relating to the temperature of the light source 122 is used, any kind of information may be used. For example, since the temperature of the light source 122 is considered to be low immediately after the startup of the projector 1, a time elapsed after the projector 1 has been powered-on may be used as the brightness information (temperature). In this case, the temperature sensor 17 is not required.

The light source control unit 14 may use a single piece of individual brightness information, as it is, in the color correction or the like, without integrating a plurality of pieces of individual brightness information. In this case, a function of integrating the pieces of individual brightness information and generating the integrated brightness information is not required.

The disposition of the R sensor 161 and the B sensor 162 is not limited to one illustrated in FIG. 2. For example, an optical element that branches light may be disposed on the optical path of the red light LR, and the R sensor 161 may be disposed at a position on which the branched light is incident. The same is true of the B sensor 162.

The specific hardware configuration of the projector 1 is not limited to one illustrated in the embodiment. For example, as an optical modulator, a reflection-type liquid crystal panel or a digital miller device (DMD) may be used instead of a light-transmissive liquid crystal panel.

The wavelength or polarization state of light used in the light source 122 is merely illustrative, and the invention is not limited thereto.

What is claimed is:

1. A projector comprising:
a light-emitting element that outputs light of a first wavelength band which is in a first polarization state;
a retardation plate that converts a portion of the light output from the light-emitting element into a second polarization state in accordance with a rotation angle of the retardation plate;
a polarization separation element that separates the light from the retardation plate into a first flux of light in the first polarization state and a second flux of light in a second polarization state;
a phosphor, excited by the first flux of light, which outputs a third flux of light of a second wavelength band different from the first wavelength band;
an optical modulator that modulates the light in accordance with a video signal;
an integration unit that integrates a plurality of pieces of brightness information;
a light-emitting element control unit that controls brightness of the light-emitting element in accordance with the integrated plurality of pieces of brightness information; and
a retardation plate control unit that controls a rotation angle of the retardation plate in accordance with the brightness information.

2. The projector according to claim 1, wherein the brightness information includes brightness information which is set in accordance with a user's instruction input.

3. The projector according to claim 1, further comprising a setting unit that sets the brightness information in accordance with an analysis result of the video signal.

4. The projector according to claim 1, further comprising:
a sensor that detects illuminance of the light which is output from the light-emitting element; and
a setting unit that sets the brightness information in accordance with an output of the sensor.

5. The projector according to claim 1,
wherein the retardation plate control unit controls the rotation angle of the retardation plate in accordance with brightness information integrated by the integration unit.

6. The projector according to claim 1, further comprising a color correction unit that performs color correction in accordance with the brightness information,
wherein the retardation plate control unit controls the rotation angle of the retardation plate in accordance with a correction result of the color correction unit.

7. The projector according to claim 6, further comprising a generation unit that generates a table for the color correction in accordance with input and output characteristics of the light-emitting element.

8. A control method comprising:
causing a light-emitting element to output light of a first wavelength band which is in a first polarization state;
causing a retardation plate to convert a portion of the light output from the light-emitting element into a second polarization state in accordance with a rotation angle of the retardation plate;
separating the light from the retardation plate into a first flux of light in the first polarization state and a second flux of light in a second polarization state;
causing a phosphor excited by the first flux of light to output a third flux of light of a second wavelength band different from the first wavelength band;
causing an optical modulator to modulate the light in accordance with a video signal;
integrating a plurality of pieces of brightness information;
controlling brightness of the light-emitting element in accordance with the integrated plurality of pieces of brightness information; and
controlling the rotation angle of the retardation plate in accordance with the brightness information.

* * * * *